United States Patent
Neet (10) Patent No.: US 7,679,253 B2
(45) Date of Patent: Mar. 16, 2010

(54) STATOR ASSEMBLY WITH CASCADED WINDING AND METHOD OF MAKING SAME

(75) Inventor: Kirk E. Neet, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 699 days.

(21) Appl. No.: 11/536,708

(22) Filed: Sep. 29, 2006

(65) Prior Publication Data

US 2007/0018527 A1    Jan. 25, 2007

Related U.S. Application Data

(60) Division of application No. 10/850,012, filed on May 19, 2004, now Pat. No. 7,129,612, which is a continuation-in-part of application No. 10/443,441, filed on May 22, 2003, now Pat. No. 6,882,077, which is a continuation-in-part of application No. 10/324,319, filed on Dec. 19, 2002, now Pat. No. 6,787,961, application No. 11/536,708, which is a continuation-in-part of application No. 10/723,527, filed on Nov. 26, 2003, now Pat. No. 6,930,426, application No. 11/536,708, which is a continuation-in-part of application No. 10/265,529, filed on Oct. 7, 2002, now Pat. No. 6,759,779, which is a continuation-in-part of application No. 10/056,890, filed on Jan. 24, 2002, now Pat. No. 6,750,581.

(60) Provisional application No. 60/454,996, filed on Mar. 14, 2003.

(51) Int. Cl.
*H02K 3/00* (2006.01)

(52) U.S. Cl. ...................................... 310/208; 310/184
(58) Field of Classification Search ................. 310/184, 310/201, 203, 206, 207, 208
See application file for complete search history.

(56) References Cited

U.S. PATENT DOCUMENTS

| | | | |
|---|---|---|---|
| 2,781,465 | A | 2/1957 | Schuff |
| 3,122,667 | A | 2/1964 | Baciu |
| 3,444,407 | A | 5/1969 | Yates |
| 3,566,171 | A | 2/1971 | Tichy et al. |
| 3,634,708 | A | 1/1972 | Fisher et al. |
| 3,660,705 | A | 5/1972 | Young |

(Continued)

FOREIGN PATENT DOCUMENTS

EP    1134872    9/2001

(Continued)

*Primary Examiner*—Dang D Le
(74) *Attorney, Agent, or Firm*—Brinks Hofer Gilson & Lione (57) ABSTRACT

A stator assembly for a dynamoelectric machine featuring a cascaded construction includes several conductors, each having a plurality of slot segments interconnected by plurality of end loop segments. The consecutive slot segments of a first conductor forms nearly all of a radially-outermost first layer of the stator winding, with the remaining portion of the radially-outermost winding layer being defined by a slot segment of a second conductor that is then inserted into the core to form nearly all of a second layer of the stator winding radially-inwardly of the first winding layer. The second winding layer is completed with an additional single slot segment of the first conductor.

10 Claims, 6 Drawing Sheets

U.S. PATENT DOCUMENTS

| | | |
|---|---|---|
| 3,753,060 A | 8/1973 | Greenwell |
| 3,753,062 A | 8/1973 | Greenwell |
| 3,780,324 A | 12/1973 | Greenwell |
| 3,821,846 A | 7/1974 | Pleiss, Jr. et al. |
| 3,838,322 A | 9/1974 | Greenwell |
| 3,854,077 A | 12/1974 | Greenwell |
| 3,884,385 A | 5/1975 | Schaefer |
| 3,990,029 A | 11/1976 | Kano et al. |
| 4,115,915 A | 9/1978 | Godfrey |
| 4,176,444 A | 12/1979 | Walker |
| 4,197,475 A | 4/1980 | Ban et al. |
| 4,206,621 A | 6/1980 | Kawasaki et al. |
| 4,426,771 A * | 1/1984 | Wang et al. ............ 29/596 |
| 4,451,749 A | 5/1984 | Kanayama et al. |
| 4,617,725 A | 10/1986 | Holter et al. |
| 4,757,601 A | 7/1988 | Leech et al. |
| 4,808,868 A | 2/1989 | Roberts |
| 4,829,206 A | 5/1989 | Honshima et al. |
| 4,896,063 A | 1/1990 | Roberts |
| 4,959,573 A | 9/1990 | Roberts |
| 5,231,324 A | 7/1993 | Kawamura et al. |
| 5,343,105 A | 8/1994 | Sakabe et al. |
| 5,444,321 A | 8/1995 | Honda et al. |
| 5,449,962 A | 9/1995 | Shichijyo et al. |
| 5,519,266 A | 5/1996 | Chitayat |
| 5,539,265 A | 7/1996 | Harris et al. |
| 5,708,316 A | 1/1998 | Ishida |
| 5,714,824 A | 2/1998 | Couture et al. |
| 5,864,193 A | 1/1999 | Katoh |
| 5,936,326 A | 8/1999 | Umeda et al. |
| 5,955,804 A | 9/1999 | Kusase et al. |
| 5,955,810 A | 9/1999 | Umeda et al. |
| 5,962,943 A | 10/1999 | Shervington |
| 5,965,965 A | 10/1999 | Umeda et al. |
| 5,986,375 A | 11/1999 | Umeda et al. |
| 5,994,802 A | 11/1999 | Shichijyo et al. |
| 5,994,813 A | 11/1999 | Umeda et al. |
| 5,998,903 A | 12/1999 | Umeda et al. |
| 6,011,332 A | 1/2000 | Umeda et al. |
| 6,037,695 A | 3/2000 | Kanazawa et al. |
| 6,049,154 A | 4/2000 | Asao et al. |
| 6,051,906 A | 4/2000 | Umeda et al. |
| 6,059,969 A | 5/2000 | Mizutani |
| 6,078,116 A | 6/2000 | Shiga et al. |
| 6,091,169 A | 7/2000 | Umeda et al. |
| 6,097,130 A | 8/2000 | Umeda et al. |
| 6,124,660 A | 9/2000 | Umeda et al. |
| 6,137,201 A | 10/2000 | Umeda et al. |
| 6,137,202 A | 10/2000 | Holmes et al. |
| 6,137,430 A | 10/2000 | Lyden et al. |
| 6,147,430 A | 11/2000 | Kusase et al. |
| 6,147,432 A | 11/2000 | Kusase et al. |
| 6,166,461 A | 12/2000 | Kusase et al. |
| 6,177,747 B1 | 1/2001 | Maeda et al. |
| 6,181,043 B1 | 1/2001 | Kusase et al. |
| 6,181,045 B1 | 1/2001 | Umeda et al. |
| 6,201,332 B1 | 3/2001 | Umeda et al. |
| 6,204,586 B1 | 3/2001 | Umeda et al. |
| 6,208,060 B1 | 3/2001 | Kusase et al. |
| 6,211,594 B1 | 4/2001 | Umeda et al. |
| 6,222,295 B1 | 4/2001 | Umeda et al. |
| 6,242,835 B1 | 6/2001 | Uemura et al. |
| 6,242,836 B1 | 6/2001 | Ishida et al. |
| 6,252,326 B1 | 6/2001 | Umeda et al. |
| 6,268,678 B1 | 7/2001 | Asao et al. |
| 6,281,614 B1 | 8/2001 | Hill |
| 6,285,105 B1 | 9/2001 | Asao et al. |
| 6,291,918 B1 | 9/2001 | Umeda et al. |
| 6,333,573 B1 | 12/2001 | Nakamura |
| 6,335,583 B1 | 1/2002 | Kusase et al. |
| 6,337,530 B1 | 1/2002 | Nakamura et al. |
| 6,348,750 B1 | 2/2002 | Taji et al. |
| 6,373,164 B1 * | 4/2002 | Nishimura ............ 310/207 |
| 6,376,961 B2 | 4/2002 | Murakami et al. |
| 6,407,476 B1 | 6/2002 | Nishimura |
| 6,417,592 B2 | 7/2002 | Nakamura et al. |
| 6,429,552 B2 | 8/2002 | Asao et al. |
| 6,448,687 B2 | 9/2002 | Higashino et al. |
| 6,484,388 B1 | 11/2002 | Amlec et al. |
| 6,486,586 B2 | 11/2002 | Higashino et al. |
| 6,492,757 B2 | 12/2002 | Nakamura et al. |
| 6,498,413 B2 | 12/2002 | Imori et al. |
| 6,501,204 B1 | 12/2002 | Oohashi et al. |
| 6,501,205 B1 | 12/2002 | Asao et al. |
| 6,504,283 B1 | 1/2003 | Asao et al. |
| 6,552,463 B2 | 4/2003 | Oohashi et al. |
| 6,570,289 B1 | 5/2003 | Liang et al. |
| 6,573,622 B2 | 6/2003 | Lim et al. |
| 6,624,544 B2 | 9/2003 | Higashino et al. |
| 6,664,677 B2 | 12/2003 | Tanaka et al. |
| 6,664,703 B2 | 12/2003 | Oketani et al. |
| 6,742,238 B2 | 6/2004 | Lee |
| 6,750,581 B2 | 6/2004 | Neet |
| 6,759,779 B2 | 7/2004 | Neet |
| 6,798,106 B2 | 9/2004 | Nakamura et al. |
| 6,851,175 B2 | 2/2005 | Brown et al. |
| 6,924,610 B2 | 8/2005 | Arimitsu et al. |
| 6,990,724 B2 | 1/2006 | Tamura et al. |
| 7,129,612 B2 * | 10/2006 | Neet .................... 310/208 |
| 2001/0024071 A1 | 9/2001 | Yoshida et al. |
| 2002/0125784 A1 | 9/2002 | Bramson et al. |
| 2003/0173860 A1 | 9/2003 | Even |
| 2004/0145267 A1 | 7/2004 | Lowry et al. |

FOREIGN PATENT DOCUMENTS

| | | |
|---|---|---|
| EP | 1109289 | 4/2002 |
| JP | 55120114 | 9/1980 |
| JP | 56083911 | 7/1981 |
| JP | 57206244 | 12/1982 |
| JP | 58192447 | 11/1983 |
| JP | 61189155 | 8/1986 |
| JP | 03107342 | 5/1991 |
| JP | 11178264 | 7/1999 |

* cited by examiner

STATOR ASSEMBLY WITH CASCADED WINDING AND METHOD OF MAKING SAME

CROSS-REFERENCE TO RELATED APPLICATIONS

This application is a divisional of U.S. application Ser. No. 10/850,012 filed May 19, 2004 now U.S. Pat. No. 7,129,612, which is a continuation-in-part of U.S. application Ser. No. 10/443,441 filed May 22, 2003, now U.S. Pat. No. 6,882,077 which is a continuation-in-part of U.S. application Ser. No. 10/324,319 filed Dec. 19, 2002, now U.S. Pat. No. 6,787,961 issued Sep. 7, 2004, which, in turn, claims benefit of U.S. provisional application No. 60/454,996 filed Mar. 14, 2003. This application is also a continuation-in-part of U.S. application Ser. No. 10/265,529 filed Oct. 7, 2002, now U.S. Pat. No. 6,759,779, which, in turn, is a continuation-in-part of U.S. application Ser. No. 10/056,890 filed Jan. 24, 2002, now U.S. Pat. No. 6,750,581. This application is also a continuation-in-part of U.S. application Ser. No. 10/723,527 filed Nov. 26, 2003 now U.S. Pat. No. 6,930,426.

FIELD OF THE INVENTION

The invention relates to cascaded stator winding configurations for dynamoelectric machines, such as an automotive electrical alternator, and methods for making such stator winding configurations using a plurality of conductors.

BACKGROUND OF THE INVENTION

Electrical alternators adapted for use in motor vehicle applications typically include a rotor assembly rotatable within an annular stator. Rotor pole pieces, which may preferably be of an interleaved "claw pole" design, rotate with the rotor shaft, while the stator itself includes a stator core defining radially-extending slots in which a plurality of stator windings are disposed. An excitation winding is carried within the cavity formed between pole pieces of the rotor, and a DC signal is applied to the excitation winding through a pair of slip rings and associated brushes. The magnetic field produced by the winding interacts with the pole pieces to create an alternating polarity magnetic field which, upon rotation of the rotor assembly as driven by the vehicle's engine, induces current flow in the stator windings in a known manner.

Because the resistance of the conductors of the stator windings is inversely proportional to alternator output and efficiency, the resistance and therefore the cross sectional area of the stator winding is an important factor for improving alternator output and efficiency. To achieve higher electrical outputs while reducing the overall size of the stator, the prior art has, therefore, sought to employ stator conductors of square or rectangular cross-section to increase conductor cross sectional area and, hence, improve the performance and efficiency of the dynamoelectric machine. Such wire can be laced into the stator core winding slots in a very densely packed configuration, thereby improving "slot space utilization." However, square- or rectangular-cross-section wire is more difficult to form and wind into the stator winding slots, since it is necessary to align the conductor cross-section with the slot.

Designers of stator assemblies further attempt to reduce or eliminate the need for providing electrical conductor terminations and connections in the stator assembly. The necessity to physically connect conductors in the stator core assembly adversely impacts cost and complexity of the manufacturing process. A particular technique for winding continuous conductors onto a stator core is disclosed in U.S. Patent Application Publications No. 2003/0137205A1 and No. 2003/0137204A1, each assigned to the assignee of the present invention, which disclosures are hereby incorporated by reference. In these published patent applications, a high-slot-fill, multi-phase stator winding is provided in which each phase is defined by a pair of interleaved conductors that alternate radial positions in each of an adjacent pair of winding layers as the conductors together traverse the core's circumference, except in the "radial shift" areas in which each conductor transitions radially inwardly to together form the next winding layer. The radially-inward winding layer pairs are then inserted atop the first winding layer pair to advantageously provide a stator winding featuring radial-aligned and, therefore, sequentially-inserted winding layers (each of which is defined by pairs of interleaved conductors).

While the above technique thus advantageously provides a radially-aligned layered stator winding, it will be appreciated that the interleaved conductors forming each winding layer pair continues to present manufacturing challenges. Accordingly, there exists a need for a method of forming a multilayered, cascaded stator winding that does not require interleaved conductors.

BRIEF SUMMARY OF THE INVENTION

A stator for a dynamoelectric machine includes a core having a generally cylindrical shape and a plurality of circumferentially-spaced core slots for receiving a cascaded winding. The term cascaded winding, utilized herein, refers to a winding having radial aligned layers as well as radial aligned conductors in each layer which allows the conductors to be sequentially inserted into the core for each layer and for each layer to be sequentially inserted into the core. The stator winding includes a plurality of electrical conductors of square- or rectangular-cross-section. Each conductor includes a pair of leads and a series of slot segments that are interconnected by end loop segments. The conductors may be formed from a continuous wire or for ease of manufacturability, may have connections between individual wires. A connection will usually appear in an end loop segment and, thus, an end loop segment can be formed from a continuous wire or be formed from two wires with a connection between the wires. Preferably, the conductors are structured in phases, as defined by a circumferential pitch.

According to an aspect of the invention, each conductor of a first set of conductors has a first plurality of consecutive slot segments, for example, adjacent to one lead, disposed in a radially-outermost first winding layer of the stator winding, for nearly one complete revolution around the stator core. Each conductor of the first set of conductors also includes an additional, first single slot segment, immediately adjacent to the first plurality of consecutive slot segments, disposed in a second, radially-inward winding layer of the stator winding. Each conductor of a second set of conductors has a first single slot segment, adjacent to one lead, disposed in the winding's first winding layer, and first plurality of consecutive slot segments, immediately adjacent to the first single slot segment, disposed in the second winding layer of the stator winding, for nearly one complete rotation around the stator core.

In accordance with another aspect of the invention, if the stator winding includes a third, cascaded winding layer defined by the slot segments of the first and second sets of conductors, the third winding layer includes a second plurality of consecutive slot segments of each of the first set's conductors that immediately follow its first single slot segment, and a second, additional single slot segment of each of the second set's conductors that immediately follow its first plurality of consecutive slot segments. Similarly, if the stator winding includes a fourth winding layer to be defined by the slot segments of the first and second sets of conductors, the fourth winding layer includes a second, additional single slot segment of each of the first set's conductors that immediately follows its second plurality of slot segments, and a second plurality of consecutive slot segments of each of the second set's conductors that immediately follow its second single slot segment (for example, adjacent to its other lead). Additional winding layers may also be provided using the first and second conductors, in a similar manner.

Thus, it will be seen that, under the invention, the first, radially-outermost winding layer is defined by the first set of conductors (forming nearly all of the first winding layer) and a single slot segment of each of the second set's conductors, adjacent its one lead; and the second winding layer, radially inward and adjacent to the first winding layer, is defined by a single slot segment of each of the first set's conductors, along with a plurality of consecutive slot segments of the second set's conductors.

According to another aspect of the invention, to ease manufacturability of cascaded stator winding, a method includes inserting the slot segments adjacent the leads of a second set of conductors into the "second set lead" slots and inserting nearly all of the slot segments of the second winding layer into the slots of the stator core prior to inserting the first set of conductors into the "second set lead" slots. Thus, the "shifted" slot segments adjacent the leads of the second winding layer will be in the radial position of the slots that define the first winding layer, while a single slot segment of each of the first set's conductors will be in the radial position of the slots that define the second winding layer.

In the event that one or more additional winding layers are desired, the method further includes inserting additional slot segments of the first set's conductors on top of the inserted slot segments of the second set's conductors. The innermost layer, which is defined by a plurality of consecutive slot segments of one set's conductors, is completed by a single slot segment of the other set's conductors.

Additional features, benefits, and advantages of the invention will become apparent to those skilled in the art to which the invention relates from the subsequent description of several exemplary embodiments and the appended claims, taken in conjunction with the accompanying Drawings.

BRIEF DESCRIPTION OF THE DRAWINGS

In the Drawings, wherein like reference numerals are used to designate like components in each of the several views, and wherein the relative thickness of certain components has been increased for clarity of illustration.

DETAILED DESCRIPTION OF THE PREFERRED EMBODIMENT

Figure 1:
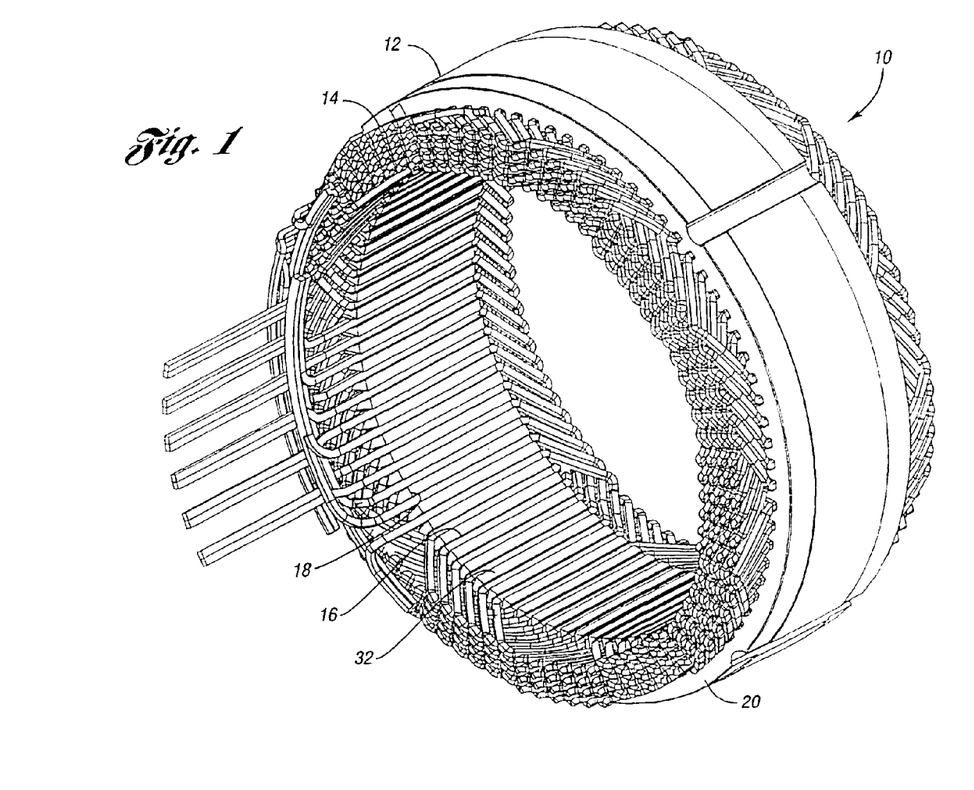
FIG. 1 is a perspective view of an exemplary stator constructed in accordance with the invention.
Figure 2:
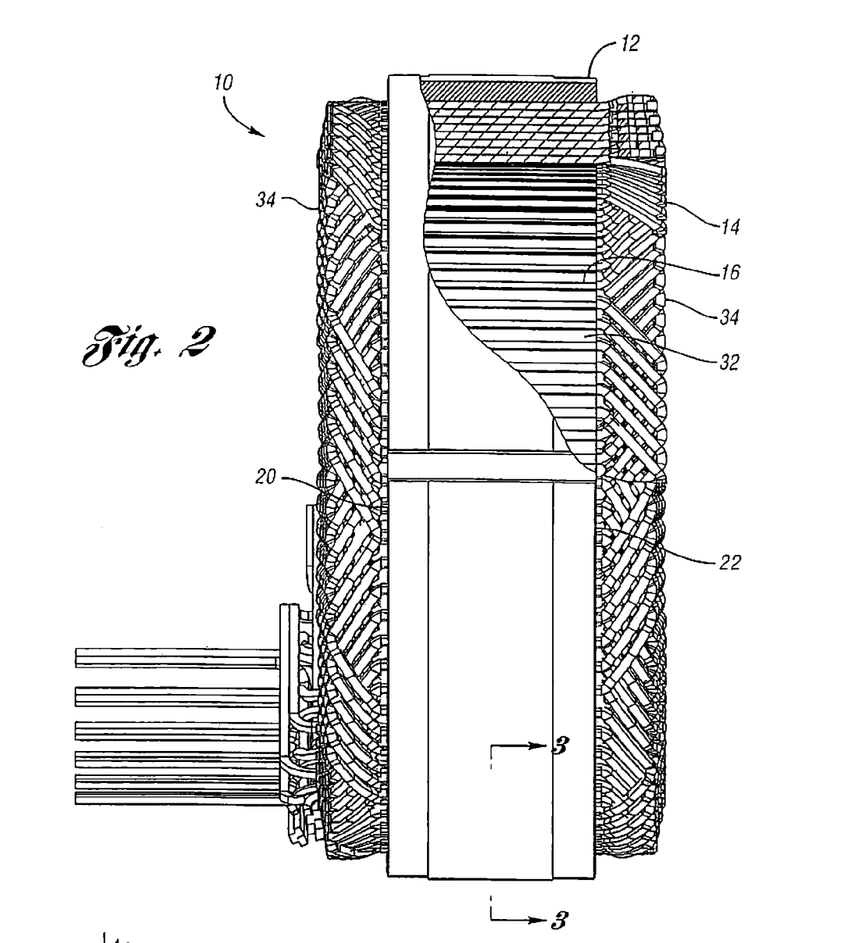
FIG. 2 is a longitudinal section, partially broken away, of the stator core of FIG. 1.
Figure 3:
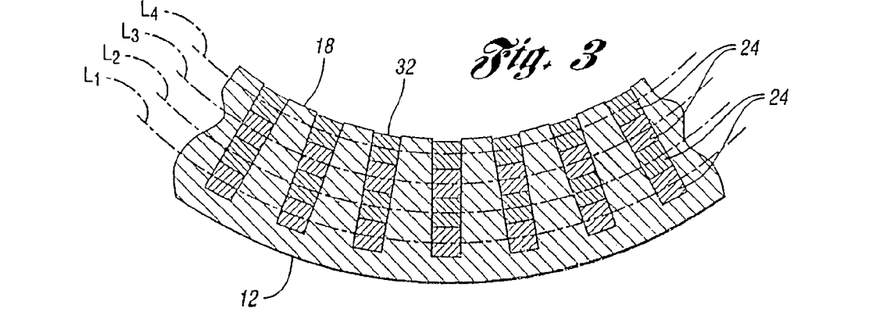
FIG. 3 is another sectional view of the stator core, taken along line 3-3 of FIG. 2, but showing only four single-conductor layers, without insulation, for clarity of illustration.

Referring to FIGS. 1-3, an exemplary twelve-conductor, six-phase, eight-layer stator 10 for a dynamoelectric machine, such as an alternator for a motor vehicle (not shown), includes a generally cylindrical stator core 12 and a stator winding 14 disposed in stator slots 16 defined about the inner periphery 18 of the stator core 12. The slots 16 are equidistantly and circumferentially spaced around the core's inner periphery 18, and extend axially through the stator core 12 from one axial end 20 of the core 12 to the other axial end 22 of the core 12.

The stator winding 14 is generally comprised of a plurality of conductors 24 wound around the stator core 12 within the stator slots 16 to thereby define concentric conductor winding layers L. As seen in FIG. 3 (in which only four separate single-conductor winding layers L are illustrated for clarity), in order to achieve a high slot fill, the conductor 24 may be of square or rectangular shape when viewed in cross-section, with the width of the conductor including any insulation being closely matched to the width of the core slots 16, including any insulation (again, not shown in FIG. 3 for clarity of illustration). For those skilled in the art, it is known that typical rectangular or square shaped conductors may include radii on the corners intermediate two adjacent edges. It is further noted that the conductor's square or rectangular cross-sectional shape advantageously increases the surface area of the conductors and, therefore, also increases the convective cooling as air passes through the stator core 12 during operation.

Figure 4:
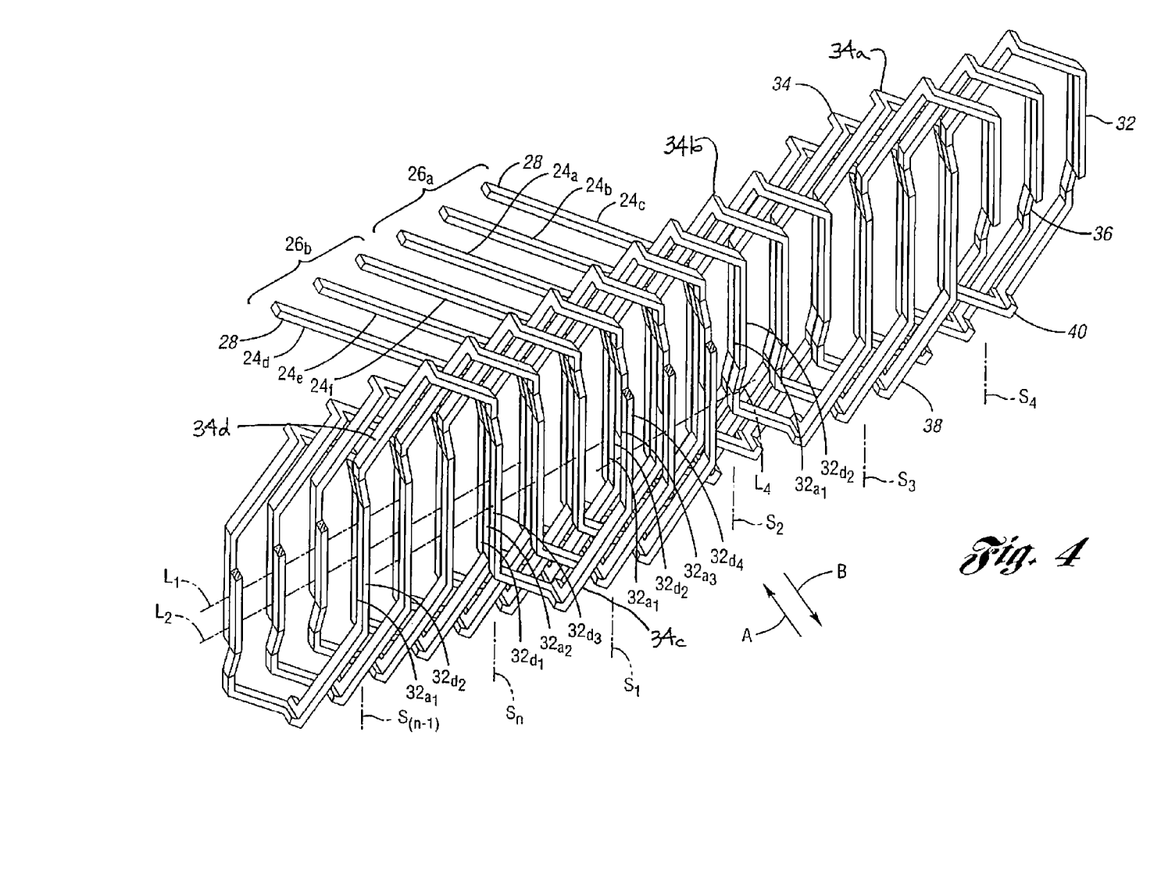
FIG. 4 is a partial view in perspective, partially broken away, of a flattened six-conductor, three-phase, four-layer stator winding in accordance with the invention.
Figure 5:
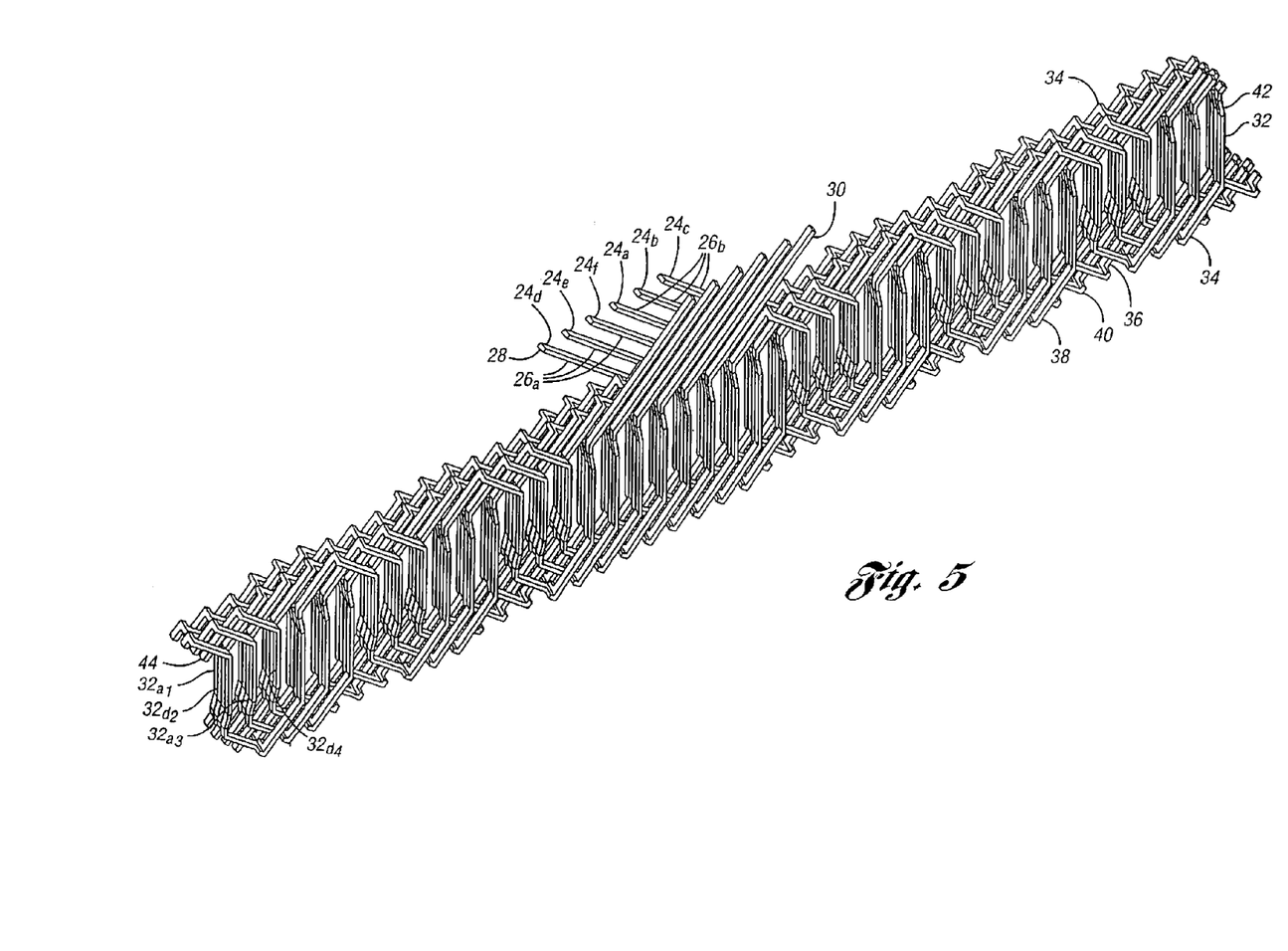
FIG. 5 is a perspective view of a complete stator winding, similar to that of FIG. 4, that has been cut at one point on the winding's circumference and flattened to better illustrate the winding's several winding layers.

As seen in the partial perspective view of a "cut" and "flattened" stator winding 14 shown in FIG. 4, and in the complete "cut" and "flattened" view of FIG. 5, both of which show a six-conductor, three-phase winding 14 for improved clarity of illustration, the stator winding 14 includes six continuous conductors 24 which are divided into a first set 26a of three conductors 24a,24b,24c and a second set 26b of three conductors 24d,24e,24f. Although sets of three conductors are shown, it is obvious to those skilled in the art that sets with any number of conductors could be utilized, such as six which is commonly used in electrical machines. Each conductor 24 includes a pair of leads 28, 30 (as best seen in FIG. 5) with which the conductors 24 are electrically interconnected to thereby define a desired number of phases in a desired ring or star configuration. Furthermore, the conductors 24 can be electrically interconnected to thereby define a desired number of phases in a plurality of ring or star configurations, such as a dual wye configuration. Each conductor 24 includes a series of slot segments 32 that are disposed within the slots 16 of the stator core 12 (for reference, the first n slots 16 into which the slot segments 32 of the first conductor 24a are inserted are designated in FIG. 4 as $S_1$ through $S_n$).

The slot segments 32 of each conductor 24 are themselves interconnected with end loop segments 34 that extend axially outwardly from the stator core 12 proximate to each stator core face 20,22, as seen in FIG. 1. Returning to FIG. 4, each end loop segment 34 includes a first leg 36 and a second leg 38 which together define an apex 40 of the end loop segment 34.

Figure 6:
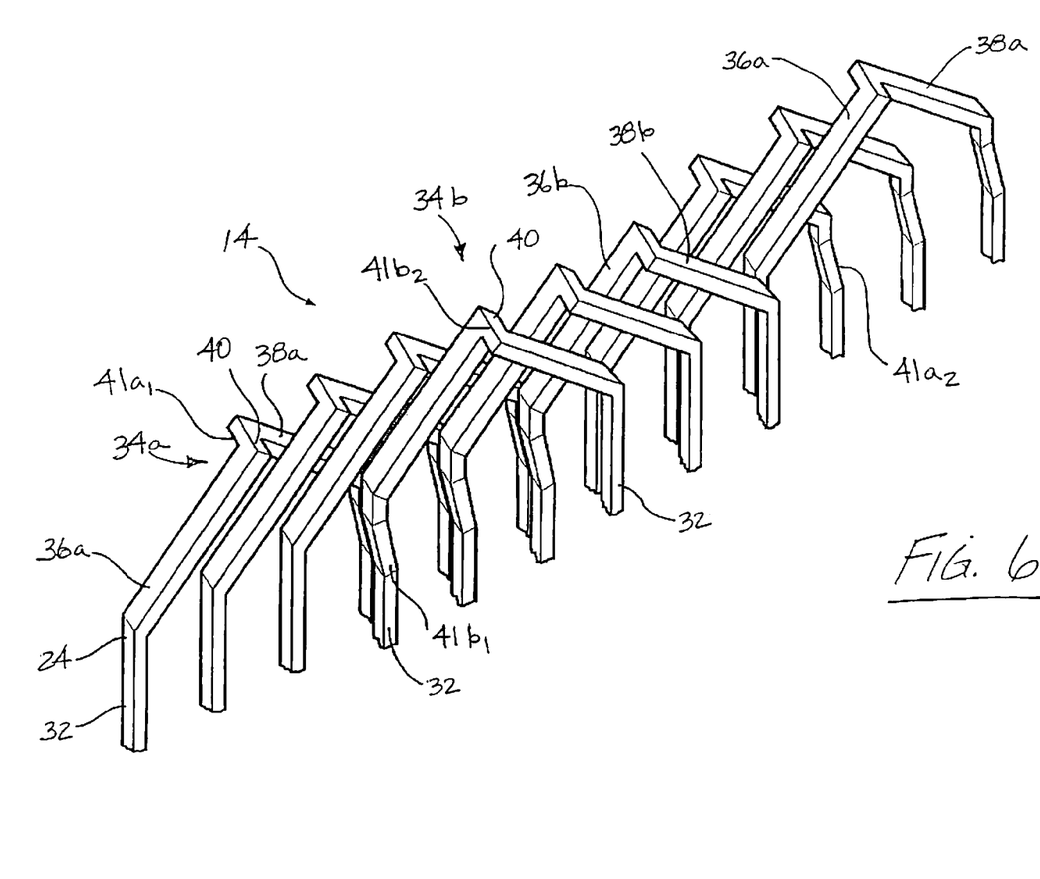
FIG. 6 is an enlarged partial view of the first two radially-outermost winding layers of the stator winding of FIG. 4, illustrating the two types of end loop segments employed in the winding between cascaded slot segments of a given conductor.

As best seen in FIG. 6, the winding 14 includes two types of end loop segments 34a, 34b. In the first type of end loop segment 34a, the first leg 36a of one end loop segment 34 interconnecting a pair of consecutive slot segments 32 remains substantially co-radial with a first of the pair of slot segments 32, i.e., remains substantially within the same layer L as the first slot segment 32, until the end loop's apex 40, whereupon a first radial extension $41a_1$ shifts the conductor 24 radially outwardly (in the direction of Arrow A in FIG. 4) roughly the radial dimension of the conductor 24. The second leg 38a of the first type of end loop segment 34a remains substantially radially-outwardly shifted as it approaches the second of the pair of consecutive slot segments 32, whereupon a second radial extension $41a_2$ shifts the conductor 24 radially inwardly (in the direction of Arrow B in FIG. 4), such that the second slot segment 32 is co-radial with the first.

Referring again to FIG. 6, in the second type of end loop segment 34b, the first leg 36b of one end loop segment 34 interconnecting a pair of consecutive slot segments 32 includes a first radial extension $41b_1$ proximate to the first slot segment 32 that shifts the conductor 24 radially outwardly (in the direction of Arrow A in FIG. 4) roughly the radial dimension of the conductor 24. The first leg 36b remains radially outwardly of the first slot segment's layer L until the end loop segment's apex 40, whereupon a second radial extension $41b_2$ shifts the conductor 24 radially inwardly (in the direction of Arrow B in FIG. 4) to a point co-radial with the first slot segment 32. The second leg 38b of the second type of end loop segment 34b remains substantially co-radial with the first slot segment 32 until it reaches the second slot segment 32 (which is also co-radial with the first slot segment 32).

In this manner, several consecutive slot segments 32 of a given conductor 24 reside in the same winding layer L of the stator winding 14 for nearly a complete revolution around the stator core 12, thereby providing the resulting winding with a substantially cascaded winding pattern, while further advantageously ensuring that the cascaded layers do not extend radially inwardly beyond the innermost layer L of the winding 14. Together, the conductors 24 define a first, radially-outermost winding layer $L_1$, and three successively adjacent, cascaded radially-inward winding layers $L_2, L_3, L_4$ (best seen in FIG. 3).

Figure 7:
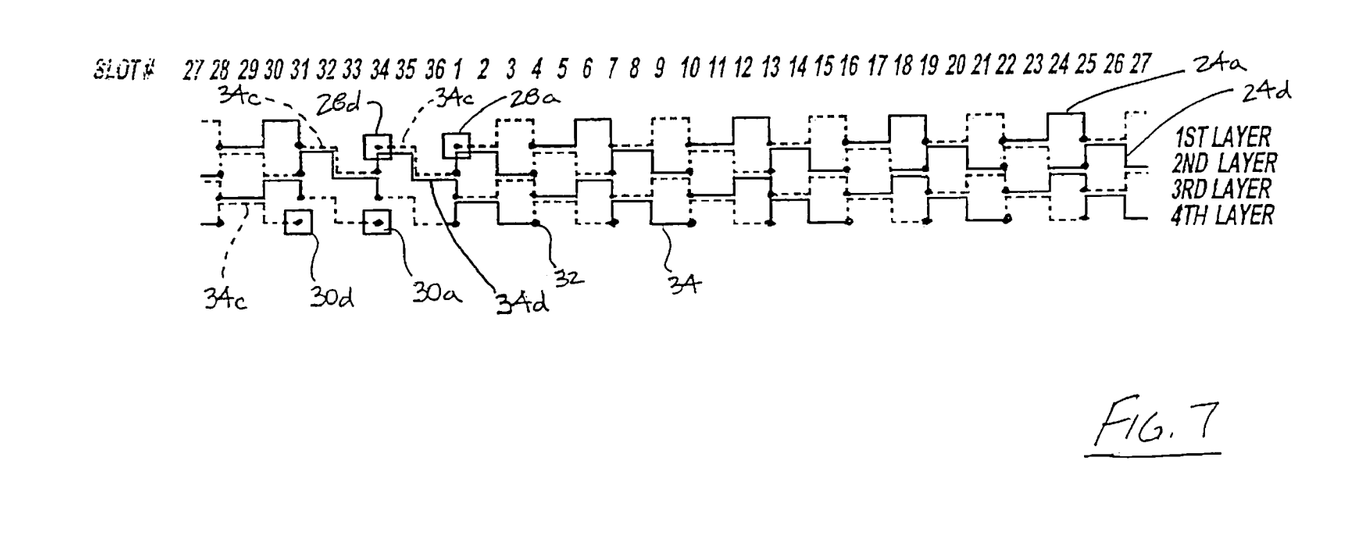
FIG. 7 is a schematic view illustrating two conductors defining one phase of the stator winding of FIG. 4, prior to insertion into the core.

FIG. 7 is a schematic diagram illustrating the transition of the conductors 24 from one layer to the next layer of the three-phase, four-layer winding pattern of FIGS. 4 and 5, as viewed from what will become the first axial end 20 of the inserted winding 14. For clarity, only the two conductors 24 forming one phase of the three-phase stator winding 14 is illustrated prior to insertion into the stator core 12, with the core slot position in which the respective slot segments 32 are disposed after insertion of the winding 14 into selected ones of the thirty-six slots 16 defined in the stator core 12.

As seen in FIG. 7, in which the end loop segments 34 defining the first stator assembly's first axial end 20 are shown in solid lines, and the end loop segments 34 on the assembly's second axial end 22 are shown in broken lines, the respective first leads 28 of the first and fourth conductors 24a,24d, as identified in the preceding Figures, are received in the first slot $S_1$ and the thirty-fourth slot $S_{34}$. From the first slot $S_1$ through the thirty-first slot $S_{31}$, a respective first plurality of consecutive slot segments 32 of the first and fourth conductors 24a,24d define the radially-outermost first layer $L_1$ and radially-inwardly-adjacent second layer $L_2$, wherein each end loop segment 34a,34b includes an equal number of radially-outward and radially-inward extensions to thereby maintain each of the consecutive slot segments 32 within the conductor's respective winding layer L.

Between the thirty-first slot $S_{31}$ and the first slot $S_1$, the two conductors 24a,24d, two types of transition area end loop segments 34c,34d interconnect slot segments 32 that are disposed in different layers L of the winding 14 and, hence, are characterized by an unequal number of radially-outward and radially-inward extensions. By way of example, the fourth conductor 24 is disposed in the first layer $L_1$ at the thirty-fourth slot $S_{34}$, whereupon the adjacent transition area end loop segment 34c (when moving left to right in FIG. 7) will be seen to include only a single radially-inward extension to thereby locate the immediately-following slot segment 32 in the second layer $L_2$ at the first slot $S_1$. By way of further example, after the first conductor 24a has traversed the stator core 12 in the first layer $L_1$ to reach the thirty-first slot $S_{31}$, the immediately adjacent transition area end loop segment 34c includes only a single radially-inward extension to thereby locate the immediately-following slot segment 32 in the second layer $L_2$ at the thirty-fourth slot $S_{34}$. The first conductor's immediately subsequent transition area end loop 34d includes three radial extensions, specifically, two radially-inward extensions and one radially-outward extension, whereby the immediately following slot segment 32 of the first conductor 24a is disposed in the third layer $L_3$ at the first slot $S_1$.

Referring again to FIG. 4, and describing the winding the first and fourth conductors 24a,24d of a particular phase for clarity of illustration, a first plurality of consecutive slot segments $32a_1$ of the first conductor 24a are disposed in the slots 16 of the stator core 12 to define nearly a complete revolution of the first winding layer $L_1$, beginning at core slot $S_1$. Before the first conductor 24a can be inserted into the last core slot $S_n$ of the first winding layer $L_1$, the fourth conductor 24d is disposed in the last core slot $S_n$ to thereby define a portion of the first winding layer $L_1$ with a single slot segment $32d_1$ immediately adjacent to its starting lead 28d.

With the single slot segment $32d_1$ occupying the last core slot $S_n$ to thereby define a portion of the first winding layer $L_1$, the first conductor 24a is disposed in core slot $S_n$ to thereby define the first slot segment $32a_2$ of the second winding layer $L_2$. A first plurality of consecutive slot segments $32d_2$ of the fourth conductor 24d are disposed in core slots $S_1$ through $S_{n-1}$ to thereby define nearly a complete revolution of the second winding layer $L_2$, while a second plurality of consecutive slot segments $32a_3$ of the first conductor 24a are disposed radially inward of these fourth conductor slot segments $32d_2$ into core slots $S_1$ through $S_{n-1}$ to thereby define nearly a complete revolution of the third winding layer $L_3$.

The fourth conductor 24d is disposed in core slot $S_{n-1}$ to thereby complete the second winding layer $L_2$, a second single slot segment $32d_3$ of the fourth conductor 24d is disposed in core slot $S_n$ to define a portion of the third winding layer $L_3$ in that slot $S_n$, whereupon the fourth conductor 24d is further disposed in the stator core 12 to thereby define nearly all of a fourth winding layer $L_4$ at core slots $S_1$ through $S_{n-1}$ (best seen in FIG. 5). A second single slot segment $32a_4$ (seen in FIG. 5) of the first conductor 24a, is disposed in core slot $S_n$ radially inward of the second single slot segment $32d_3$ of the fourth conductor 24d, completes the fourth winding layer $L_4$.

The other conductors 24b,24c of the first conductor set 26a are disposed in the core slots 16 in a like manner as the first conductor 24a, but for their relative circumferential positions about the stator core 12. Similarly, the other conductors 24e, 24f of the second conductor set 26b are disposed in the core slots 16 in a like manner as the fourth conductor 24d, but for their relative circumferential positions about the stator core 12. In this manner, the slot segments 32 of the conductors 24 of all of the phases in the radially-outermost slot position define the first winding layer $L_1$, whereupon the slot segments 32 of the conductors 24 fill increasingly-radially-inward positions within the stator core's slots 16.

Also as best seen in FIG. 4, the end loop segments 34a,34b of the several conductors 24 overlap to thereby permit consecutive slot segments 32 of each conductor 24 to traverse the stator core 12 within a given winding layer L. Specifically, the legs 36,38 of the conductor's end loop segments 34 permit several conductors 24 to be positioned in a cascaded structure having a suitable number of phases. By way of example only, the exemplary stator 10 has three phases, respectively defined by the first and fourth conductors 24a,24d, the second and fifth conductors 24b,24e, and the third and sixth conductors 24c,24f. Although only three phases have been shown, those skilled in the art will realize any number of phases could be utilized, such as six.

Thus, when the first set 26a of conductors 24a,24b,24c have made nearly one complete revolution around the stator core 12, the respective transition area end loop segments 34c on the axial end 22 connecting each conductor's next-to-last slot segment 32 (such as the slot segment $32a_1$ disposed in slot $S_{n-1}$) from the last slot segment 32 (such as the slot segment $32a_2$ disposed in slot $S_n$) defines a radial extension that shifts the respective conductor 24a,24b,24c radially inwardly, such that the conductor's last slot segment 32 is positioned in the next, immediately-radially-inward winding layer $L_2$. Similarly, the transition area end loop segments 34d on the axial end 20 connecting each conductor's last slot segment 32 in a given layer L (such as $32a_2$ disposed in slot $S_n$) from the following slot segment 32 in a different layer L (such as $32a_3$ disposed in slot $S_1$) each define a radial extension that shifts the respective conductor 24a,24b,24c radially inwardly, such that the following slot segment ($32a_3$) is positioned in the next, immediately-radially-inward winding layer (in this case, the third layer $L_3$).

And, when the first set 26a of conductors 24a,24b,24c completes the remainder of the winding layer $L_3$, the transition area end loop segment 34c located on the axial end 22 separating the next-to-last slot segment 32 from the last slot segment 32 of the conductors 24a,24b,24c (adjacent to the ending leads 30) defines a radial extension that shifts the respective conductors 24a,24b,24c radially inward, such that the conductors last slot segment adjacent the ending leads 30 is positioned in the radially-innermost fourth layer $L_4$.

With respect to the second set 26b of conductors, the first slot segments 32 adjacent the leads 28, such as slot segment $32d_1$ disposed in slot $S_n$, is located in layer $L_1$. The transition area end loop segments 34c located on the second axial end 22 of the core, which connect the first slot segments 32 (disposed in slot $S_n$) with the second slot segments 32 (disposed in slot $S_1$) defines a radial extension that shifts the respective conductors 24d,24e,24f radially inward, such that the second slot segments are disposed in the next, immediately-radially-inward layer $L_2$. When the second set 26a of conductors 24d, 24e,24f have made nearly one complete revolution around the stator core 12 disposed in layer $L_2$, the respective transition area end loop segment 34d on the axial end 20 connecting the last slot segment 32, (such as slot segment $32d_2$ disposed in slot $S_{n-1}$) from the immediately-following slot segment 32 (such as slot segment $32d_3$ disposed in slot $S_n$) of the conductors 24d,24e,24f defines a radial extension that shifts the respective conductor 24d,24e,24f radially inwardly, such that the conductor's next slot segment 32 is positioned in the next, immediately-radially-inward winding layer $L_3$.

Furthermore, the transition area end loop segment 34c on the second axial end 22 connecting, for example, the fourth conductor's next slot segment $32d_3$ (disposed in slot $S_n$) from the following slot segment $32d_4$ (disposed in slot $S_1$) defines a radial extension that shifts the conductor 24d radially inwardly, such that slot segment $32d_4$ is positioned in the next, immediately-radially-inward winding layer $L_4$. In this manner, transition area end loop segments 34c,34d that shift a conductor radially inward to thereby interconnect slot segments 32 disposed in different layers include a radial extension in the inward direction by having at least one more inward radial extension or adjustment than the number of outward radial extensions or adjustments.

As seen in FIG. 4, certain transition area end loop segments certain special end loop segments 34c are characterized by one inward radial adjustment and zero outward radial adjustments, while other transition area end loop segments 34d are characterized by two inward radial adjustments and one outward radial adjustment. For a stator having L number of layers, the number of transition area end loop segments 34c, 34d which interconnect two slot segments 32 disposed in different layers is equal to 2L−2 per phase. For a stator having P number of electrical poles, the number of total end loop segments 34 per phase is equal to (P−1)*L. Therefore, a stator having eight Poles and eight layers has fifty-six total number of end loop segments 34 per phase, of which fourteen end loop segments are transition area end loop segments 34c,34d interconnecting slot segments 32 disposed in different layers L. This results in a winding 14 in which 25% of the end loop segments 34 are transition area end loop segments 34c,34d.

Furthermore, a stator having ten Poles and four layers has thirty-six total number of end loop segments 34 per phase, of which six end loop segments 34 are transition area end loop segments 34c,34d connecting slot segments 32 in different layer. This results in a winding 14 in which 16.7% of the end loop segments 34 are transition area end loop segments 34c, 34d. Conversely, for the two mentioned cases, the winding 14 respectively includes 75% and 83.3% of all end loop segments 34 connect two slot segments 32 disposed in the same layer. Consequently, the winding 14 for the two respective cases respectively includes 25% and 16.7% of the end loop segments 34 are transition area end loop segments 34c,34d, characterized by having one more radial inward adjustment than outward adjustments.

FIG. 5 shows a complete stator winding 14, cut at one point and "flattened" for ease of illustration. Following each conductor 24 from one starting lead 28 towards the first cut end 42 and then again from the second cut end 44 back towards the ending leads 30, the stator winding 24 has a cascaded construction as discussed above, with the first set 26a of conductors 24a,24b,24c defining nearly all of the radially-outermost first winding layer $L_1$, an initial portion of the intermediate second winding layer $L_2$, nearly all of the third winding layer $L_3$ and an initial portion of the radially-innermost fourth winding layer $L_4$.

The second set 26b of conductors 24d,24e,24f define the remaining portion of the radially-outermost first winding layer $L_1$, nearly all of the second winding layer $L_2$, an initial portion of the third winding layer $L_3$, and nearly all of the radially-innermost fourth winding layer $L_4$. The two conductors, such as 24a and 24d, could be formed of one continuous wire. This can be achieved by an incorporating an auxiliary continuous end loop (not shown) between the two leads 30 of the conductors 24a and 24d. Similarly, the conductors 24b and 24e could be formed from one continuous wire and conductors 24c and 24f could be formed from one continuous wire. Although the two conductors, such as 24a and 24d, are formed from one wire, for simplicity of description, they are still considered as two conductors, such as 24a and 24d.

The preceding discussion has centered around a winding 14 having a single slot segment 32 (such as $32d_1$ of the second conductor 24d) disposed in the first layer $L_1$ of the winding and, therefore, a single slot segment 32 (such as $32a_2$, of the first conductor 24a) disposed in the second layer $L_2$. For space concerns, however, it may be desirable to separate the leads 28 of the conductors 24d, 24e, 24f of the second conductor set 26b from the leads 28 of the conductors 24a, 24b, 24c of the first conductor set 26a. This can be accomplished by disposing the second conductor set 26b shifted over three additional slots such that the slot segment $32d_1$ is disposed in slot $S_{n-1}$.

In this case, the second conductor 24d does not have a single slot segment $32d_1$ disposed in the first layer $L_1$, but rather two slot segments 32 disposed in the first layer $L_1$ adjacent the lead 24d. The first slot segment $32d_1$ is disposed in the first layer $L_1$ of slot $S_{n-1}$ and a second slot segment 32 is disposed in the first layer $L_1$ of slot $S_n$. The other conductors 24e,24f of the second conductor set 26b are disposed in the core slots 16 in a like manner as the conductor 24d, but for their relative circumferential positions about the stator core 12.

Similarly, the conductor 24a of the first conductor set 26a has a slot segment $32a_2$ disposed in the second layer $L_2$ of slot $S_{n-1}$ and a slot segment 32 disposed in the second layer $L_2$ of slot $S_n$. The other conductors 24b,24c of the first conductor set 26a are disposed in the core slots 16 in a like manner as the first conductor 24a, but for their relative circumferential positions about the stator core 12. Similarly, further layers, such as $L_3$ and $L_4$, would have two slot segments 32 of each conductor 24a and 24d disposed in a certain layer rather than a single slot segment 32 as previously discussed. Furthermore, the leads 28 of the second conductor set 26b could be further shifted any number of slots 16 resulting in a plurality of slot segments 32 of the second conductor 24d being disposed in the first layer $L_1$ and a plurality of slot segments 32 of the first conductor 24a being disposed in the second layer $L_2$.

While the above description constitutes the preferred embodiment, it will be appreciated that the invention is susceptible to modification, variation and change without departing from the proper scope and fair meaning of the subjoined claims. For example, while the invention is disclosed above in connection with an exemplary stator assembly of bifilar construction, it will be appreciated that the invention contemplates other multi-filar or monofilar configurations. Similarly, while the invention is described above in connection with a "claw pole" type rotor design, the invention contemplates use of the described winding configuration and winding method in conjunction with other types of rotors, such as permanent-magnet non-claw pole, permanent-magnet claw pole, salient field wound and induction type rotors.

What is claimed is:

1. A stator assembly for a dynamoelectric machine comprising:
a stator core having a generally cylindrical shape, and a plurality of circumferentially-spaced radial slots defined in a peripheral surface of the stator core;
a stator winding including at least one conductor, wherein each of the at least one conductor includes a plurality of slot segments interconnected by a plurality of end loop segments, the slot segments being disposed within the slots of the stator core to define a plurality of concentric winding layers, and the plurality of end loop segments including a first type of end loop segment interconnecting two slot segments disposed in the same layer and a second type of end loop segment interconnecting one slot segment of one layer with one slot segment of a different layer; and
wherein fewer than 26% of the plurality of end loop segments are the second type of end loop segments.

2. The stator assembly of claim 1, wherein fewer than 17% of the plurality of end loop segments are the second type of end loop segments.

3. The stator assembly of claim 1, wherein at least one of the conductors includes a portion of the conductor which is formed from a continuous wire, the portion includes a group of five consecutive slot segments connected with four end loop segments, wherein two end loop segments of the group are of the first type, and wherein two of the end loop segments of the group are of the second type.

4. The stator assembly of claim 1, wherein the winding is arranged as a cascaded winding.

5. A stator assembly for a dynamoelectric machine comprising:
a stator core having a generally cylindrical shape, and a plurality of circumferentially-spaced radial slots defined in a peripheral surface of the stator core;
a stator winding including at least one conductor, wherein each of the at least one conductor includes a plurality of slot segments interconnected by a plurality of end loop segments, the slot segments are disposed within the slots of the stator core to define a plurality of concentric winding layers, and
the plurality of end loop segments of the stator include at least one end loop segment having at least two radial adjustments per end loop segment and wherein the number of inward radial adjustments equals the number of outward radial adjustments and at least one end loop segment having one more inward radial adjustment than outward radial adjustments per end loop segment.

6. The stator assembly of claim 5, further including at least one end loop segment having only one radial adjustment per end loop segment.

7. The stator assembly of claim 6, further including at least one end loop segment having only two inward radial adjustments and only one outward radial adjustment for each end loop segment.

8. The stator assembly of claim 5, wherein at least 74% of the plurality of end loop segments being the type of end loop segment having at least two radial adjustments and having an equal number of inward radial adjustments as outward radial adjustments.

9. The stator assembly of claim 8, wherein at least 83% of the plurality of end loop segments being the type of end loop segment having at least two radial adjustments and having an equal number of inward radial adjustments as outward radial adjustments.

10. A stator assembly for an automotive alternator comprising:
a stator core having a generally cylindrical shape, and a plurality of circumferentially-spaced radial slots defined in a peripheral surface of the stator core; and
a stator winding including at least one conductor, wherein each of the at least one conductor includes a plurality of slot segments interconnected by a plurality of end loop segments, the slot segments being disposed within the slots of the stator core to define a plurality of concentric winding layers,
wherein at least 74% of the plurality of end loop segments being an end loop segment of a first type which has at least two radial adjustments with the number of inward radial adjustments being equal to the number of outward radial adjustments; and wherein the plurality of end loop segments include at least one end loop segment having one more inward radial adjustment than outward radial adjustments per end loop segment, at least one end loop segment having only one radial adjustment per end loop segment, and at least one end loop segment having only two inward radial adjustments and only one outward radial adjustment for each end loop segment.

\* \* \* \* \*